(12) United States Patent
Rice et al.

(10) Patent No.: US 6,353,043 B1
(45) Date of Patent: Mar. 5, 2002

(54) MULTI-COLORED EPOXY COATING SYSTEM

(75) Inventors: Brian Rice, Perkiomenville; Albert Turansky, Slatington, both of PA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/570,263

(22) Filed: May 12, 2000

(51) Int. Cl.$^7$ .................................................. C08J 3/20
(52) U.S. Cl. ..................... 523/303; 523/458; 523/466
(58) Field of Search ................... 523/303, 458, 523/466

(56) References Cited

U.S. PATENT DOCUMENTS 5,985,987 A * 11/1999 Adolfsson .................. 524/593
6,146,145 A * 11/2000 Itakura ........................ 434/93

* cited by examiner

Primary Examiner—Robert Dawson
Assistant Examiner—D. Aylward
(74) Attorney, Agent, or Firm—Pitney, Hardin, Kipp & Szuch LLP

(57) ABSTRACT

An epoxy coating base composition and a color system of tinting the composition are provided in which a single base formulation of epoxy coating material can be combined with selected amounts of tinting compositions from one or more tinting sources to provide a selectively colored high solids epoxy coating composition. The base compositions include an uncured epoxy resin. White, light colored or neutral pigments are advantageously added to the resin. Wetting agents and other additives are also advantageously added. To this, colored pigments can be added as desired to provide a colored composition in a rainbow of colors, based on red, yellow and blue and also black and varied gray tones.

37 Claims, 1 Drawing Sheet

MULTI-COLORED EPOXY COATING SYSTEM

BACKGROUND OF THE INVENTION

The invention relates generally to multi-colored epoxy coating compositions and more particularly to a system including one or more base compositions and a set of tinting compositions for coloring the base compositions to yield epoxy coating compositions in a variety of colors.

Multi-colored paint systems are known in which a variety of tinting compositions can be used to custom tint a one component solvent based or water based paint compositions. For example, one can go to a paint store, select a flat, gloss or semi-gloss white base paint and a color from a color chart and by adding specified amounts of tinting compositions from a pre-assembled set, the base paint can be colored to match the color selected from the color chart. However, the same procedure has not existed with respect to two-component epoxy type high solids coatings. As used herein, epoxy materials will be given the ordinary meaning of epoxy in the field, including materials which are applied in a relatively soft or liquid state as a mixed two or more component system, one of the components including ingredients having reactive epoxide groups. Another component is generally referred to as the hardener or activator. Known epoxy resins are made from epichlorohydrin, bisphenol A, bisphenol F or other aliphatic polyols such as glycerol. Such materials can be characterized by a glycidyl ether structure and are commonly cured with a variety of amines and/or amides. The result of the combination of the components is a resin based on the reactivity of such epoxide groups.

In contrast to the virtually unlimited colors which can be achieved from one-component solvent based and water based paint systems, high solids colored epoxy coating compositions tend to be formulated individually, for a specific desired color and not with a versatile base composition which can be tinted as desired. For example, Lee and Neville's "Handbook of Epoxy Resins", copyrighted in 1967, Chapter 24, p. 33, describes two formulas for epoxy-coating compositions:

| Material | Percent by Weight |
|---|---|
| Red Lead Primer Dispersion | |
| Red Lead | 69% |
| Diatomaceous Earth | 6.5% |
| Magnesium Silicate | 5.4% |
| Aluminum Stearate | 0.3% |
| Resin Vehicle | 18.8% |
| DGEBA, 55% | |
| Toluene, 22.5% | |
| Methyl isobutyl ketone, 20.3% | |
| Butyl Cellosolve, 2.2% | |
| Used at 79.5% in letdown base | |
| Dark-Green Enamel Dispersion | |
| Phthalocyanine Green | 25% |
| Resin Vehicle | 75% |
| DGEBA 33 1/3% | |
| Butanol, 33 1/3% | |
| Toluene, 33 1/3% | |
| Used at 44% in letdown base | |

As can be seen, the formulations for these compositions are significantly different. While it is true that the red formulation is characterized as a primer and the green formulation is characterized as an enamel, it is believed that families of colored epoxy coating compositions varying only in pigment selection are heretofore unknown. Moreover, the approach of formulating colored epoxy coating compositions for each specific color has not changed significantly over the past 30-plus years.

For example, referring to a 1992 list of colored coating compositions available from Shell, significant differences can be seen in the black enamel, white enamel and gray enamel formulations. Also, the black formulation instructions call for steel ball mill processing for 48 hours and the white and gray enamel instructions call for high speed dispersing equipment or a sand mill.

| Material | Pounds |
|---|---|
| Black Enamel No. 401 | |
| Curing Agent Component | |
| Mill Grind | |
| Carbon black: Monarch 880 (Cabot-Corporation, Special Blacks Division) | 13.6 |
| EPON CURING AGENT V-15-X-70 | 98.7 |
| Ethyl 3-Ethoxy Propionate | 41.0 |
| Let down | |
| EPON CURING AGENT V-15-X-70 | 29.6 |
| n-Butanol | 17.9 |
| Ethyl 3-Ethoxy Propionate | 193.4 |
| Paint Additive #11 (Dow Corning Corporation) | 0.8 |
| Total Curing Agent Component | 395.0 |
| Base Component | |
| EPON ® Resin 1001-CX-75 | 217.5 |
| Beetle 216-8 (American Cyanamid Company) | 13.6 |
| Xylene | 175.5 |
| Total Base Component | 406.6 |
| TOTAL FORMULATION | 801.6 |
| White Enamel No. 416 | |
| Base Component | |
| Pigments | |
| Ti-Pure R-902 (E.I. duPont de Nemours & Company, Inc.) | 240.2 |
| Phthalocyanine Blue | (trace) |
| Mistron CF5A (Cyprus Industrial Minerals Company) | 32.5 |
| Vehicle | |
| EPRON ® Resin 1001-CX-75 | 264.4 |
| Beetle 216-8 (American Cyanamid Company) | 12.1 |
| MIBK | 29.8 |
| Propylene glycol methyl ether | 55.4 |
| Cyclohexanol | 7.5 |
| Xylene | 35.8 |
| Tolulene | 133.3 |
| Total Base Component | 811.0 |
| Curing Agent Component | |
| EPRON CURING AGENT ® C-112H | 98.4 |
| Methyl Isobutyl Ketone | 86.3 |
| Total Curing Agent Component | 184.7 |
| TOTAL FORMULATION | 995.7 |
| Gray Enamel No. 434 | |
| Base Component | |
| Pigments | |
| Ti-Pure R-902 (E.I. duPont de Nemours & Company, Inc.) | 175 |

-continued

| Material | Pounds |
| --- | --- |
| PFICARB 200 (Harcros Pigments, Inc.) | 65 |
| Sparmite (Harcros Pigments, Inc.) | 20 |
| Carbon Black LB-1011 (Harcros Pigments, Inc.) | 4 |
| Slurry: Bentone 34 (Rheox, Inc.) 95% ethanol in water 65/35 by weight | 8 |
| Vehicle | |
| EPRON ® Resin 1001-CX-75 | 301 |
| Beetle 216-8 (American Cyanamid Company) | 12 |
| MIBK | 64 |
| Propylene glycol methyl ether | 76 |
| Xylene | 79 |
| Total Base Component | 804 |
| Curing Agent Component | |
| EPRON CURING AGENT V-15-70 | 174 |
| Methyl isobutyl ketone | 18 |
| Total Curing Agent Component | 192 |
| TOTAL FORMULATION | 996 |

One factor which interferes with the ability to provide a standard base and various pigments which can be mixed into the base to change color tones at will, is related to the nature of colored pigments. For example, various data sheets for formulating colored epoxy compositions describe steel ball milling and grinding the ingredients for 48 hours. This is not compatible with a tint-to-order system.

Accordingly, it is desirable to provide a base composition and a set of tinting compositions which can be combined with the base composition to provide epoxy coatings in a rainbow of colors and which overcome other drawbacks or unsatisfactory characteristics of the prior art.

SUMMARY OF THE INVENTION

Generally speaking, in accordance with the invention, an epoxy coating base composition and a color system of tinting the composition are provided in which a single base formulation of epoxy coating material can be combined with selected amounts of tinting compositions from one or more tinting sources to provide a selectively colored epoxy coating composition, such as a high solids epoxy coating composition. The base compositions include an uncured epoxy resin. White or white base producing pigments are advantageously added to the resin and ground to a Hegman 6 or smaller. Wetting agents and other additives are also advantageously added. Neutral pigments can be added after the grind. White or light colored pigments are advantageously added to the resin. These can be ground to Hegman 6 or smaller. Wetting agents and other additives are also advantageously added. Neutral pigments are added after the grind. To this, colored pigments can be added as desired to provide a colored composition in a rainbow of colors, based on red, yellow and blue and also black and varied gray tones.

The invention accordingly comprises compositions possessing the characteristics, properties and the relations of components and a system and method involving these compositions, which will be exemplified in the compositions, methods and systems hereinafter described.

BRIEF DESCRIPTION OF THE DRAWINGS

For a fuller understanding of the invention, reference is had to the following description, taken in connection with the accompanying drawings, in which.

DETAILED DESCRIPTION OF THE PREFERRED EMBODIMENTS

Figure 1:
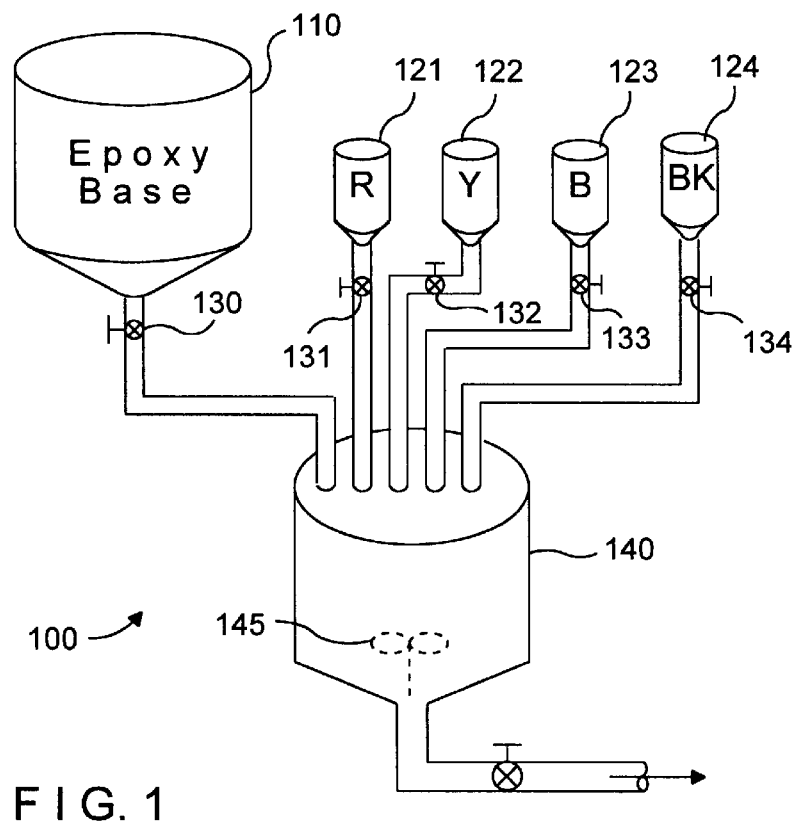
FIG. 1 is a schematic diagram of a system in accordance with a preferred embodiment of the invention for providing a multitude of differently colored epoxy coating compositions, all formulated from the same base composition.

The invention is directed to a base epoxy coating composition and a set of tinting compositions which are compatible with the base compositions to provide the ability to custom tint the base composition to a selected color. The resulting colored epoxy coating composition can include red, yellow and blue tones. Thus, the composition can be tinted red, yellow or blue and also orange, which includes red and yellow tones, green, which includes blue and yellow tones, or purple, which includes red and blue tones, and various shades and variations thereof In a preferred embodiment of the invention, the base composition can also be tinted black or to various levels of gray.

Color materials and pigments could not be added to existing epoxy coating compositions because the chemistries of the existing coating compositions could and generally would perform differently with different pigment materials. This would yield color inconsistencies such as flooding and floating. It has been determined that pigments are inorganic and organic materials in the form of particles, with charges and densities that must be balanced with the coating binder/resin composition and any solvents, fillers, flow agents and other additives which may be present in the composition. Thus, while prior compositions have been formulated to balance the characteristics of one particular pigment, the formulations which are known for one color pigment will generally not be applicable to other differently colored pigments.

In a one-component system, after the coating material, such as latex paint, is applied to the substrate, the solvents evaporate. This tends to increase the viscosity and thus the immobility of pigment particles within the coating film. Thus, movement and color imbalances and inconsistencies have not been a problem in one component solvent based systems, because pigment movement is generally inhibited by the application process.

On the other hand, the phenomenon of an evaporating solvent leading to pigment mobility inhibition does not occur with most two (or more) component epoxy type coating compositions. This is especially true with 100% solids or high solids thermosetting coatings, where the applied coating stays "liquid" and the particles stay mobile for relatively long periods of time.

The term "high solids" compositions refers to compositions without significant amounts of volatile components. For example, many known two component systems which would not be classified as high solids compositions contain 50 to 60% volatiles, which evaporate within about 48 hours after the coating composition is applied. In preferred embodiments of the invention, the coating composition can be formulated substantially without volatile organic compounds. Thus, compositions in which the solids component (as opposed to the volatiles component) is greater than 70%, and even 90%, 95% (said volatiles component being incidental to some of the commercially available additives which are added in small quantities) and higher can be achieved. Thus, the advantages of the invention can even be achieved with substantially 100% solids formulations.

The pigment in an epoxy coating composition is generally stabilized in one of the components of the coating system. It has been determined that when the components are combined to initiate hardening, a different set of charges and polarities must be dealt with, as well as various changes in viscosity and particle mobility. Thus, pigment instability can occur before the composition hardens. Furthermore, various components in the two-component system are reacting and cross-linking is occurring and the system characteristics which keep the colored particles evenly dispersed can change radically during the hardening process. Thus, it has been determined that as the two components react, changes occur in the density, charge balance, wetting properties, and so forth of the coating composition. These changes can destabilize pigments in the coating and lead to flooding, floating and a number of other color defects.

Previously, these difficulties have been addressed by formulating a specific two-component system to a specific set of pigments, additives and processing techniques. However, by carefully matching a set of pigments to a suitable base composition, the problem of pigment compatibility in multi-component epoxy coating systems has been solved. By matching the compatibility of the binder/resin to pigments, by the choice of materials, additives, amounts of additives and processing of those additives in the binder/resin pigment mixture, suitable compositions have been developed. Accordingly, a high solids or 100% solids coating can be formulated to provide one coat film thicknesses of about 8 to 20 mils and higher.

Base compositions in accordance with preferred embodiments of the invention can include the following ingredients:

About 30%–90% epoxy resin, preferably about 40% to 60% epoxy resin. Such resins can include bisphenol and novalac types of resins.

About 0.1% to 10% additives, including wetting agents, slip agents, anti foam agents and flow agents. Preferred are polymeric acrylic wetting agents.

About 10% to 60%, white, light or neutral particles or pigments. Preferred are $TiO_2$ particles.

About 30% to 60% fillers, such as silica, magnesium silicate, talc and synthetic or glass beads can also be employed.

About 2–15% epoxy diluents are also advantageous.

To the base composition can be added various combinations of about 0.1% to 10%, preferably about 0.5% to about 5% standard colored pigments, including oxides, such as iron oxide, phthalo-type and quinacridone pigments as well as lamp black. The colored base composition is then combined with standard hardeners suitable for the epoxy resin selected.

Various hardener compositions, such as those based on amines and amides, including polyamides can be used. The choice of hardener depends on the various applications of the coating composition, such as temperature and humidity. Preferred hardeners include any or all of cycloaliphatic amines based on isophorone diamine, aliphatic polyamines and aliphatic polyoxypropyleneamine. The weight ratio of hardener to resin component can be about 1:3 and varies with the exact hardener selected and application conditions and surfaces.

Aspects and embodiments of the invention will be exemplified with reference to the following examples. These examples are presented for purposes of illustration only and are not intended to be construed in a limiting sense. The compositions presented were mixed with appropriate hardeners, applied to substrates and acceptable uniformly colored epoxy coated substrates were obtained.

The following abbreviations will be used for chemical components that are advantageously included in coating compositions in accordance with the invention and in the examples:

TABLE 1

| Abbreviation | Chemical Name or Identification | Company |
| --- | --- | --- |
| BYK 161, 162 & 163 | Block copolymer with pigment affined groups | BYK CHEMIE 525 S. Cherry St., Wallingford, CT 06492 |
| Perenol F40 | Acrylated Copolymer | COGNIS 300 Brookside Ave. Ambler, PA 19002 |
| Surfynol 440 | Ethoxylated Non-ionic Acetylenicdiol | AIR PRODUCTS AND CHEMICALS, INC. 7201 Hamilton Blvd. Allentown, PA 18195-1501 |
| BYK 080 | Non-aqueous emulsion of a polysiloxane copolymer | BYK CHEMIE 525 S. Cherry St., Wallingford, CT 06492 |
| BYK 555 | Foam destroying polymers, non-silicone | BYK CHEMIE 525 S. Cherry St., Wallingford, CT 06492 |
| Bis A Epoxy Resin, EPON 828 | Bisphenol A, diglycidyl ether of | SHELL CHEMICAL COMPANY Houston, TX 77252 |
| DER 331 | | DOW CHEMICAL CO. P.O. Box 1026 Midland, MI 48674 |
| Araldite 6010 | | CIBA SPECIALITY CHEMICALS 540 White Plains Road Tarrytown, NY 10591 |
| Bis F Epoxy Resin | Bisphenol F, diglycidyl ether of | SHELL CHEMICAL |

TABLE 1-continued

| Abbreviation | Chemical Name or Identification | Company |
| --- | --- | --- |
| | DPL 862 | COMPANY<br>Houston, TX 77252 |
| | GY 282 | CIBA Specialty Chemicals<br>Additive Div.<br>540 White Plains Rd.<br>Tarrytown, NY 10591 |
| | Epalloy 8230, 8250 | CVC<br>2980 Rt. 73 North<br>Maple Shade, NJ 08052 |
| Novolac Epoxy Resin | Phenol-Formaldehyde Polymer of glycidyl ether (EPN1138, 1139) | CIBA Specialty Chemicals<br>Additive Div.<br>540 White Plains Rd.<br>Tarrytown, NY 10591 |
| | DEN 439 | DOW CHEMICAL COMPANY<br>PO Box 1206<br>Midland, MI 48674 |
| BYK 410, 411 | Modified polymeric urea | BYK CHEMIE<br>525 S. Cherry St.,<br>Wallingford, CT 06492 |
| BYK 500 | Foam destroying polymer, silicone free | BYK CHEMIE<br>525 S. Cherry St.,<br>Wallingford, CT 06492 |
| Disparlon KS-873N | Surfactant amine salt in Xylene | KING INDUSTRIES<br>Norwalk, CT |
| L-1983 | Polyacrylate | KING INDUSTRIES<br>Norwalk, CT |
| Nuosperse 657 | Oligomeric Wetting Agent | CONDEA SERVO LLC<br>2 Turner Pl.<br>Piscataway, NJ 08855 |
| Serad FX 9085 | Polymeric acrylate base wetting agent | CONDEA SERVO LLC<br>2 Turner Pl.<br>Piscataway, NJ 08855 |
| CT-136 & CT-141 & CT-151 | Anionic dispersants | AIR PRODUCTS AND<br>CHEMICALS, INC.<br>7201 Hamilton Blvd.<br>Allentown, PA 18195-1501 |
| CAFA 250 | Non-functional polyacrylate solution | PCI GROUP<br>Tempe, Az |
| CAFA 350 | Epoxy functional polyacrylate solution | PCI GROUP<br>Tempe, Az |
| CAFA 450 | Acid functional polyacrylate solution | PCI GROUP<br>Tempe, Az |
| GE10 | Cresyl Glycidyl Ether | CVC<br>2980 Rt. 73 North<br>Maple Shade, NJ 08052 |
| GE20 | Neopentyl Glycol Diglycidyl Ether | CVC<br>2980 Rt. 73 North<br>Maple Shade, NJ 08052 |
| GE22 | Cyclohexanedimethanol Diglycidyl Ether | CVC<br>2980 Rt. 73 North<br>Maple Shade, NJ 08052 |
| Heloxy 107 | Cyclohexanedimethanol Diglycidyl Ether | SHELL CHEMICAL<br>COMPANY<br>Houston, TX 77252 |
| Epodil 757 | Cyclohexanedimethanol Diglycidyl Ether | AIR PRODUCTS AND<br>CHEMICALS, INC.<br>7201 Hamilton Blvd.<br>Allentown, PA 18195-1501 |
| GE30 | Trimethylol propane Triglycidyl Ether | CVC<br>2980 Rt. 73 North<br>Maple Shade, NJ 08052 |
| Cyclic Ester | Butyrolactone | BASF CORPORATION<br>3000 Continental Dr.<br>North Mount Olive, NJ 07828<br>ARCO CHEMICAL CO.<br>2502 Sheidon Rd.<br>Channelview, TX |
| Heloxy 7 | Alkyl Glycidyl Ether (C8–C10) | SHELL CHEMICAL<br>COMPANY<br>Houston, TX 77252 |
| Epodil 747 | Alkyl Glycidyl Ether (C8–C10) | AIR PRODUCTS AND<br>CHEMICALS, INC.<br>7201 Hamilton Blvd.<br>Allentown, PA 18195-1501 |
| Heloxy 8 | Alkyl Glycidyl Ether (C12–C14) | SHELL CHEMICAL<br>COMPANY<br>Houston, TX 77252 |

TABLE 1-continued

| Abbreviation | Chemical Name or Identification | Company |
| --- | --- | --- |
| Epodil 748 | Alkyl Glycidyl Ether (C12–C14) | AIR PRODUCTS AND CHEMICALS, INC. 7201 Hamilton Blvd. Allentown, PA 18195-1501 |
| Heloxy 9 | Alkyl Glycidyl Ether | SHELL CHEMICAL COMPANY Houston, TX 77252 |
| Epodil 746 | 2-Ethylhexyl Glycidyl Ether | AIR PRODUCTS AND CHEMICALS, INC. 7201 Hamilton Blvd. Allentown, PA 18195-1501 |
| Carbonic Ester | Propylene Carbonate, Ethylene Carbonate or blends thereof | HUNTSMAN CORPORATION Conroe, TX 77305 LYONDELL 3801 Westchester Pike Newtown Square, PA 19073 |
| Heloxy 67 | Butanediol diglycidyl Ether | SHELL CHEMICAL COMPANY Houston, TX 77252 |
| Epodil 750 | Butanediol diglycidyl Ether | AIR PRODUCTS AND CHEMICALS, INC. 7201 Hamilton Blvd. Allentown, PA 18195-1501 |

EXAMPLE 1

White Dispersion Base Composition

The following white dispersion (WD) base composition was prepared by blending the ingredients with high shear until the ingredients were well ground. Disperser, sandmill, pebble mill, 3-roll mill and/or other grinding types of mixers are acceptable.

| Material | Percent By Weight |
| --- | --- |
| EPOXY RESIN: Bis A, Bis F or Novalac types. Examples DER 331, Epotuf 37–140, Epon 828, DBR 330, Eppaloy 8230, 8250, GY 282, DPL 862, EPN 1138, 1139, DPL 862, DEN 439 or DER 361 | 40%–90% |
| ADDITIVES: BYK 161, 162, 163, 410, 411, 500, Disparlon KS-873N, L-1983, Perenol F-40, Nuosperse 657, SER AD FX 9085, Surfynol 440, CT-136, Ct-141, CT151, TG, CAFA 250, CAFA 350, and CAFA 450 | 0.1%–10% |
| TITANIUM DIOXIDE: Kronos 2102, 2310, TR93, R900, R902, R960, RCL9 and RCL535 | 10%–60% |

If excess epoxy resin is included, the coating can have insufficiently low hiding power. This could result in the color appearing diaphanous or appear to be washed out. Thus, attaining selected color could be difficult or impossible. Reactivity would also increase and this could affect the coating application. If epoxy resin levels are too low, the final composition could have inadequate coating qualities. It could be too thick to apply easily, smoothly or with standard techniques and technologies. Surface leveling, gloss and texture could also be adversely affected.

If the additive quantity is insufficiently low, its ability to render the color materials compatible with the system can become inadequate to yield a uniform color throughout the cured colored coating composition. Also, although using below the specified amount of additive may be sufficient to render the pigments compatible in certain colors, problems can arise when other "more difficult" colors are selected. The use of excess additive can destabilize the pigment to binder compatibility, by the way the additive builds up on an already "saturated" pigment particle surface. This excess "build-up" layer can actually lead to some of the color problems which the additives are intended to solve. Serad FX 9085 (polymeric acrylate base wetting agent), BYK 161 and BYK 163, (block copolymers with pigment affined groups) and CAFA (nonfunctional polyacrylate solution) are preferred wetting agents. Perenol F40 (acrylated copolymer surfynol 440 (ethoxylated non-ionic acetylenicdiol) BYK 080 (non-aqueous emulsion of a polysiloxane copolymer) and BYK 555 (foam destroying non-silicone polymer are preferred surface modifying additives.

Including excess $TiO_2$ can lead to improper color attainment and high and potentially unmanageable viscosity, which leads to undesirable application properties. Including too little $TiO_2$ can cause improper color attainment and low hiding power of the coating.

EXAMPLE 2

Let Down Composition

The following let down (LD) composition was prepared by combining the following ingredients and mixing until consistent.

| Material | Percent By Weight |
| --- | --- |
| EPOXY RESIN: Bis A, Bis F or Novalac types. Examples DER 331, 37–140, Epon 828, DER 330, Eppaloy 8230, 8250, GY 282, DPL 862, EPN 1138, 1139, DPL 862, DEN 439 or DER 361 | 30%–65% |
| FILLERS: Examples: Magnesium Silicate, Aluminum Trihydrate, Ground Silicas, Calcium Carbonate, Barium Sulfate, Synthetic Beads, Mica, Aluminum Silicate glass and or blends of any of these | 30%–60% |
| DILUENTS: Reactive type epoxy diluents: | 2%–15% |

-continued

| Material | Percent By Weight |
|---|---|
| Examples GE10, GE20, GE22, GE30, Cyclic Ester, Heloxy 7, Heloxy 8, Heloxy 9, Heloxy 67, Heloxy 107, Carbonic Ester, Epodil 746, Epodil 747, Epodil 748, Epodil 757 | |
| ADDITIVES: Leveling And Air Release BYK 161, 162, 163, 410, 411, 500, Disparlon KS-873N, L-1983, Perenol F-40, Nuosperse 657, SER AD FX 9085, Surfynol 440, CT-136, Ct-141, CT151, TG, CAFA 250, CAFA 350, CAFA 450, BYK A 500, BYK 104, BYK 080, BYK 361, BYK 066, BYK 555, DOW DB-100, BYK A 525 and BYK 530 | 0.5%–8% |
| TITANIUM DIOXIDE: Kronos 2102, 2310, TR93, R900, R902, R960, RCL9 and RCL535 | 10%–60% |

Including excess epoxy resin can adversely affect the polymerization (curing) of the final coating. Proper color attainment can also be adversely affected as well as curing rate and application properties and characteristics.

Including insufficient resin can lead to coating materials which are difficult to apply using standard techniques.

Including excess filler can adversely affect the application properties and the appearance of the finished coating. Excess filler can also adversely affect adhesion, various rates of reaction, and mechanical properties such as hardness and/or abrasion resistance. Including insufficient filler can also adversely affect the application properties of the coating material as well as the final appearance of the product. The amount of filler must be balanced by proper amounts of reactants that are employed to produce a finished polymer of selected properties.

When insufficient diluent is included, certain application properties, such as leveling of the coating can be adversely affected. Adverse coating effects could occur if excess diluent is included. Furthermore, inclusion of too much or too little diluent can affect the packaging scheme, which simplifies and satisfies the stoichiometric requirements of a complex thermosetting polymeric system.

Including too little additive can adversely affect the surface and color consistency. Excess additive can create build up problems which can lead to floating, floating, color rub-up and other color problems.

EXAMPLE 3

Pastel Tint Base

A pastel tint base was prepared by mixing about 40%–70% of the Let Down composition of Example 2 with about 30% to 60% of the white Color Dispersion Example 1.

EXAMPLE 4

Midtone Tint Base

A midtone tint base was prepared by mixing, about 50% to 80% of the Let Down composition of Example 2 with about 20% to 50% of the WD composition of Example 1.

EXAMPLE 5

Deeptone Tint Base

A deeptone tint base was prepared by mixing about 60%–90% of the Let Down composition of Example 2 with 10% to 40% of the White Color Dispersion composition of Example 1.

EXAMPLE 6

Ultradeeptone Tint Base

An ultradeeptone tint base was prepared by mixing 90–100% let down of Example 2 with 0–10% of other additives.

EXAMPLE 7

Light Grey Pastel Coating Composition

To form a light gray coating composition having a pastel appearance, a one gallon can (3402 grams) of a pastel tint base in accordance with Example 3 was provided. To this one gallon can, the following tints were added and mixed by shaking for three-twelve minutes in a conventional paint shaker until the color is consistent. The tints were from the 844 series of Creanova, Inc. of Piscataway, N.J.:

| Pigment | Identification Number | Amount |
|---|---|---|
| Lamp Black | 844-9955 | 7 grams |
| Yellow Iron Oxide | 844-1863 | 11 grams |
| Phthalo Green | 844-5558 | 0.48 grams |

After application and hardening, an acceptable light gray epoxy coating composition was obtained.

EXAMPLE 8

Medium Blue

The Following Pigments from the 844 Series of Creanova, Inc. of Piscataway, N.J. were added to one gallon (3402 grams) of a mid tone tint base coating composition in accordance with Example 4.

| Pigment | Identification Number | Amount |
|---|---|---|
| Lamp Black | 844-9955 | 16.5 grams |
| Phthalo Blue | 844-7262 | 69.1 grams |
| Quinacridone Red | 844-0451 | 17.2 grams |

After hardening, an acceptable medium blue epoxy coating was obtained.

EXAMPLE 9

Deep Tone Tan

The following tints from the 844 Series of Creanova, Inc. of Piscataway, N.J. were added to one gallon (3402 grams) of a Deep Tone tint base of Example 5.

| Pigment | Identification Number | Amount |
|---|---|---|
| Lamp Black | 844-9955 | 8.9 grams |
| Yellow Iron Oxide | 844-1863 | 107.9 grams |
| Red Iron Oxide | 844-1063 | 16.4 grams |

After hardening, an acceptable tan epoxy coating was obtained.

EXAMPLE 10

Dark Green

The following 844 Series Tints from Creanova, Inc. of Piscataway, N.J. were added to one gallon (3402 grams) of an Ultra-Deep Tone Tint base of Example 6.

| Color | Identification Number | Amount |
|---|---|---|
| Lamp Black | 844-9955 | 2.8 grams |
| Yellow Iron Oxide | 844-1863 | 54.9 grams |
| Phthalo Green | 844-5558 | 68.9 grams |
| White | 844-0061 | 29.2 grams |

After hardening, an acceptable dark green epoxy coating composition was obtained.

EXAMPLE 11

TB White Dispersion 34 pounds of bisphenol A diglycidyl ether resin (EPON 828 or CIBA 6010) was mixed at slow speed for 5 minutes in a 55 gallon drum. A 30 or 60 horse disperser with a 12 inch F-type blade can be used. 1.08 pounds of SER-AD FX 9085 polymeric acrylate base wetting agent and 45.0 pounds of TiPure R902 $TiO_2$ particles were added slowly and mixed for 30 minutes on medium speed. The pigment grind target was greater than Hegman 6. 20.1 pounds of additional EPON 828 or CIBA 6010 resin was added and mixed for 10 minutes at slow speed. The resulting white dispersion was compatible with a variety of colored pigments and when mixed with a hardening agent, provided a wide variety of colored epoxy coating compositions based on red, yellow and blue tones, (i.e., green compositions are based on blue and yellow tones).

EXAMPLE 12

White Dispersion

| Material | Percent by Weight |
|---|---|
| EPON 828 | 43.67% |
| SERAD FX 9085 | 1.32% |
| TiPure R900 | 55.01% |

The resin and wetting agent were added in order and mixed for 5 minutes, or until consistent. The $TiO_2$ pigment was then added slowly with a disperser and a shear type blade for 30 minutes at medium to high speed to yield a Hegman grind of 6 or greater.

This base was compatible with a wide variety of colored pigments and when combined with a hardener, provides a durable epoxy coating in a rainbow of colors.

EXAMPLE 13

White Dispersion

| Material | Percent by Weight |
|---|---|
| GY 282 resin (Bisphenol F diglycidyl ether) | 33.831% |
| SER-AD FX 9085 | 0.240% |
| Ti Pure R902 | 10.006% |
| GY282 resin | 55.923% |

The resin and wetting agent were added in order and mixed for about 5 minutes, until consistent. The $TiO_2$ powder was then added slowly and mixed with a disperser and a shear type blade until consistent, for about 30 minutes. A grind of Hegman 6+ was achieved before adding the remaining resin.

This dispersion was compatible with a variety of differently colored pigments and provided a rainbow of differently colored epoxy coatings.

EXAMPLE 14

Let Down

Step 1. The following liquid ingredients were placed into a mixing pot and mixed at slow speed for about 5 minutes.

| | |
|---|---|
| 49 lbs. | EPON 828 or CIBA 6010 |
| 134.4 g | anti-settle resin concentrate, (glycerin) available from Ashland Chemical Co. of Columbus, OH. |
| 7.7 lbs | propylene carbonate, sold under the name HIPURE, from Huntsman Corp. of Conroe, TX |
| 2.5 lbs | butyrolactone, sold under the name BLO, from BASF Corp. of North Mount Olive, NJ. |

Step 2. The following ingredients were added slowly to the resin mixture and mixed for 10 minutes on medium speed.

| | |
|---|---|
| 493.2 g | HDK WACKER N20 or AEROSIL 200 fumed silica particles |
| 266 lbs | talc powder (MP 45/26 Montana Talc) |
| 897 g | MISTRON MONOMIX talc |
| 3.6 lbs | 325 Mesh silica |
| 13.4 lbs | PR3/PF11R Glass beads |
| 3.6 lbs | OMYA or Snow White 12 calcium carbonate powder |

Step 3. The remaining ingredients were added in order, slowly and mixed on slow speed for about 10 minutes.

| | |
|---|---|
| 274.9 g | anti foam agent (BYK-555) |
| 420.4 g | MODA Flow, a flow agent available from Solutia, St. Louis, MO. |

The resulting composition was compatible with a variety of pigment materials and lends to epoxy coating compositions in a rainbow of colors.

EXAMPLE 15

Let Down

Step 1. The following ingredients were combined and mixed for about 15 minutes, until consistent. All percentages are by weight.

| Material | Percent by Weight |
|---|---|
| Bisphenol A polymer of glycidyl ether (DER 330) | 30% |
| ground silica | 10% |
| synthetic glass beads | 20% |
| magnesium silicate | 18% |
| calcium carbonate | 6% |

Step 2. The following ingredients were then added and mixed for about 10 minutes, until consistent.

| Material | Percent by Weight |
|---|---|
| alkyl glycidyl ether (Epodil 747) | 15% |
| BYK 555 | 0.5% |
| Modaflow | 0.5% |

The composition was compatible with a variety of pigments to provide epoxy coatings in a rainbow of colors.

EXAMPLE 16

Let Down

Step 1. The following ingredients were combined and mixed for about 15 minutes until consistent.

| Material | Percent by Weight |
|---|---|
| Novolac epoxy resin (Epalloy 8230) | 83.8% |
| ground silica | 5.0% |
| Synthetic glass beads | 5.0% |
| magnesium silicate | 5.0% |
| calcium carbonate | 2.7% |

Step 2. add the following ingredients and mix about 10 minutes, until consistent.

| Material | Percent by Weight |
|---|---|
| GE 22 | 3.0% |
| BYK 066 | 0.5% |
| CAFA | 5.0% |

The resulting composition was compatible with a variety of differently colored pigments to provide epoxy coating compositions in a rainbow of colors.

EXAMPLE 17

Pastel Tint Base

| 72.6 lbs | Let Down |
|---|---|
| 27.4 lbs | White Dispersion |

These ingredients were mixed for about 15 minutes consistent to provide a pastel base compatible with a variety of differently colored pigments to provide epoxy coatings in a rainbow of colors.

EXAMPLE 18

Midtone Tint Base

| 72.6 lbs | Let Down |
|---|---|
| 20.6 lbs | White Dispersion |

These ingredients were mixed for about 15 minutes until consistent to provide a pastel base compatible with a variety of differently colored pigments to provide epoxy coatings in a rainbow of colors.

EXAMPLE 19

Deeptone Tint Base

| 83.1 lbs | Let Down |
|---|---|
| 16.9 lbs | White Dispersion |

These ingredients were mixed for about 15 minutes until consistent to provide a pastel base compatible with a variety of differently colored pigments to provide epoxy coatings in a rainbow of colors.

EXAMPLE 20

Ultradeeptone Tint Base

Step 1. The following liquid ingredients were added to a 55 gal drum mixing pot and mixed at medium speed for about 10 minutes with a 12" F type blade until consistent.

| 48 lbs | EPON 828 or CIBA 6010 |
|---|---|
| 134.7 g | anti-settle resin concentrate |
| 889.4 g | Ser-Ad FX 9085 |

Step 2. The next two ingredients were added and mixed for 5 minutes until consistent.

| 2.5 lbs | Butyrolactone (BLO) |
|---|---|
| 7.5 lbs | Propylene carbonate (HiPure) |

Step 3. The next set of ingredients were added slowly and mixed for about 10 minutes on medium speed.

| 483.5 g | HDK WACKER N20/200AEROSIL |
|---|---|
| 15.2 lbs | MP 45/26 Montana Talc |
| 879.8 g | Mistron Monomix |
| 3.6 lbs | 325 mesh silica |
| 13.1 lbs | PR3/PF11R glass beads |
| 3.5 lbs | OMYA 14 or Snow White 12 |

Step 4. Add remaining ingredients, in order, slowly and mix on slow speed for about 10 minutes.

| 269.5 g | BYK-555 |
|---|---|
| 412.2 g | MODA FLOW |

The resulting composition provided a Let Down composition that was compatible with a variety of differently colored pigments to provide epoxy coatings in a rainbow of colors.

EXAMPLE 21

Deep Red

The following 844 series pigments available from Creanova Inc. of N.J. were added to 1 gallon (3402 g) of an Ultradeeptone Base, such as that of Example 20, shaken for 3–12 minutes until consistent and provided acceptable deep red epoxy coatings.

| Pigment | Identification Number | Amount |
| --- | --- | --- |
| Lamp Black | 844-9955 | 8.4 grams |
| Titanium White | 844-0061 | 39.6 grams |
| Red Iron Oxide | 844-1063 | 102.8 grams |
| Quinacridone Red | 844-0451 | 15.9 grams |

EXAMPLE 22

Yellow

The following 844 series pigments were added to 3402 g of a pastel base, such as that of Example 17, shaken for 3–12 minutes until consistent and provided acceptable yellow epoxy coatings.

| Pigment | Identification Number | Amount |
| --- | --- | --- |
| Organic Yellow | 844-2852 | 3.1 grams |
| Yellow Iron Oxide | 844-1863 | 8.5 grams |

EXAMPLE 23

Medium Green

The following pigments were added to 3402 g of pastel bases, such as that of Example 17, shaken for 3–12 minutes until consistent and provided an acceptable medium green epoxy coatings.

| Pigment | Identification Number | Amount |
| --- | --- | --- |
| Lamp Black | 844-9955 | 3.5 grams |
| Yellow Iron Oxide | 844-1863 | 32.3 grams |
| Phthalo Green | 844-5558 | 16.1 grams |

EXAMPLE 24

Teal

The following pigments were added to 3402 g of deeptone bases, such as that of Example 19, shaken for 3–12 minutes until consistent and provided acceptable teal epoxy coatings.

| Pigment | Identification Number | Amount |
| --- | --- | --- |
| Lamp Black | 844-9955 | 0.7 grams |
| Phthalo Blue | 844-7262 | 28.1 grams |
| Phthalo Green | 844-5558 | 122 grams |

EXAMPLE 25

Plum

The following pigments were added to 3402 g of ultradeeptone bases, such as that of Example 20, shaken for 3–12 minutes until consistent and provided acceptable plum (purple) epoxy coatings.

| Pigment | Identification Number | Amount |
| --- | --- | --- |
| Lamp Black | 844-9955 | 24 grams |
| Quinacridone Violet | 844-9451 | 13.8 grams |
| Red Iron Oxide | 844-1063 | 35.7 grams |

EXAMPLE 26

Orange

The following pigments were added to ultradeeptone bases, such as that of Example 20, shaken for 3–12 minutes until consistent and provided acceptable orange epoxy coatings.

| Pigment | Identification Number | Amount |
| --- | --- | --- |
| Unleaded Medium Yellow | 844-2555 | 132.0 grams |
| Quinacridone Red | 844-0451 | 4.0 grams |
| Unleaded Orange | 844-0982 | 5.0 grams |
| Yellow Iron Oxide | 844-1863 | 29.6 grams |

Figure 2:
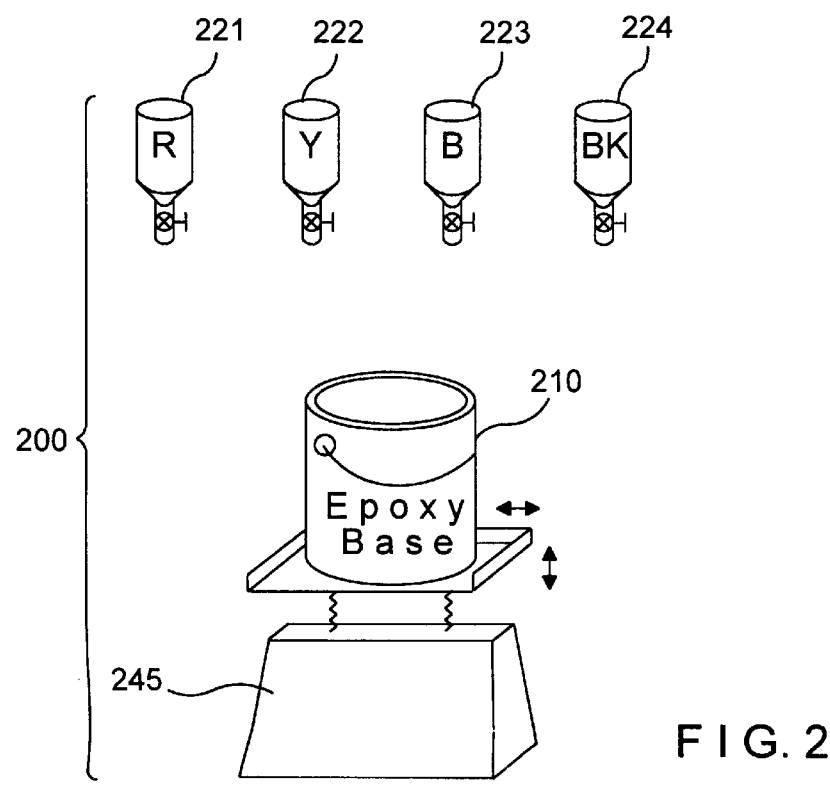
FIG. 2 is a schematic diagram of a system in accordance with different preferred embodiments of the invention for providing a multitude of differently colored epoxy coating compositions, all formulated from the same base composition.

Systems for providing multi-colored epoxy coatings are shown in FIGS. 1 and 2. In FIG. 1, an industrial system 100 includes one or more tanks 110 of an epoxy base composition and a series of hoppers 121–124 containing pigments, such as, but not limited to red, yellow, blue and black pigments. The amount of base and pigment added to a mixing drum 140 which, includes a mixing blade 145 can be controlled by a series of controls 130–134. A consumer oriented system 200 is shown in FIG. 2. Pigments from a set of hoppers 221–224 are selectively added to a can 210 of epoxy base composition and mixed with a shaker 245.

EXAMPLE 27

Hardener

The following hardener was used in connection with the above Examples. The ingredients were mixed at a slow speed for about 15 minutes until consistent.

| | |
| --- | --- |
| 57 lbs | Modified IPDA cycloaliphatic amine sold under the name Pacific Anchor 1618, from Air Products of Allentown, PA. |
| 14 lbs | aliphatic polyamine sold under the name Pacific Anchor 1768 or Versamine 642 CE, from Air Products or Cognis of Allentown, PA or Ambler, PA. |
| 30 lbs | modified aliphatic polyoxypropylene amine sold under the name Pacific Anchor 1784 or Versamine 643 CE. |

Acceptable proportions of the above hardener to 1 gallon of pastel, midtone, deeptone or ultradeeptone base, which weighs about 7.5 to 7.6 lbs was about 2.4 to 2.5 lbs.

It will thus be seen that the objects set forth above, among those made apparent from the preceding description, are efficiently obtained and, since certain changes may be made in the above-compositions of matter without departing from the spirit and scope of the invention, it is intended that all matter contained in the above-description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly, it is to be understood that in said claims, ingredients or compounds recited in a singular are intended to include compatible mixtures of such ingredients wherever the sense permits.

What is claimed is:

1. A system for providing multi-colored epoxy coatings, comprising:
    a plurality of containers containing differently colored pigments;
    a hardener formulated to cure an uncured epoxy resin; and
    a base coating composition comprising at least one uncured epoxy resin, light colored or white particles, and at least one wetting agent which interacts with the light colored or white particles; and the colored pigments, hardener, and base coating composition are sufficiently compatible so that a plurality of different amounts and combinations of the differently colored pigments can be added to the base composition and the base composition together with the differently colored pigments can be cured by the hardener, to provide a plurality of differently colored epoxy coatings with a substantially uniform color.

2. The system of claim 1, wherein the colored pigments, hardener and base composition can provide epoxy coatings having at least colors based on the colors red, yellow and blue and combinations thereof.

3. The system of claim 2, wherein the system can provide gray epoxy coatings.

4. The system of claim 1, wherein the resin is selected from the group consisting of bisphenol A, bisphenol F and novalac epoxy resins and derivatives thereof.

5. The system of claim 1, wherein the uncured epoxy resin component comprises a diglycidyl ether of Bisphenol A.

6. The system of claim 1, wherein the base coating composition comprises about 30% to 90% epoxy resin.

7. The system of claim 4, wherein the epoxy coatings can have colors based on at least red, yellow and blue and the base coating composition comprises about 30% to 90% epoxy resin.

8. The system of claim 1, wherein the light colored or white particles are size 6 on a Hegman scale or smaller.

9. The system of claim 1, wherein the light colored or white particle component comprises $TiO_2$ pigment particles.

10. The system of claim 7, wherein the light colored or white particle component comprises $TiO_2$ pigment particles.

11. The system of claim 1, comprising 10–60% $TiO_2$ particles.

12. The system of claim 1, wherein the base coating composition comprises an additive selected from the group consisting of acrylated copolymer wetting agents, ethoxylated non-ionic acetylenicdiol and modified polymeric urea.

13. The system of claim 1, wherein the base coating composition comprises a polymeric acrylate based wetting agent.

14. The system of claim 8, wherein the base coating composition comprises a polymeric acrylate based wetting agent.

15. The system of claim 1, wherein the base coating composition comprises foam destroying polymers.

16. The system of claim 2, wherein the base coating composition comprises at least one polyacrylate solution.

17. The system of claim 1, wherein the base coating composition comprises reactive-type epoxy diluents.

18. The system of claim 9, wherein the base coating composition comprises filler particles.

19. The system of claim 18, wherein the filler particles are selected from the group consisting of silica, magnesium silicate, talc and glass beads.

20. The system of claim 18, wherein the filler particle component is selected from the group consisting of aluminum trihydrate, calcium carbonate, mica and aluminum silicate.

21. The system of claim 1, wherein the epoxy coating is a substantially 100% solids coating.

22. The system of claim 1, wherein one coat of the coating composition can be applied to form a coat at least 8 mils thick.

23. The system of claim 1, wherein the base coating composition comprises propylene carbonate.

24. The system of claim 1, wherein the base coating composition comprises butyrolcatone.

25. An epoxy coating composition, comprising an uncured epoxy resin and a wetting agent, the composition formulated to be compatible with at least two different colored pigments in varied proportions so as to be capable of providing substantially uniform, homogeneous multi-colored epoxy coatings from a single base composition substantially without flooding or floating of the colored pigments by mixing in different amounts of the at least two colored pigments and curing the differently colored epoxy compositions.

26. The composition of claim 25, comprising light, white or neutral colored particles.

27. The composition of claim 25, wherein the epoxy is present as 30–90 percent of the composition.

28. The composition of claim 27, comprising about 10–60% light, white or neutral colored particles.

29. The composition of claim 25, comprising an additive selected from the group consisting of acrylated copolymer wetting agents, ethoxylated non-ionic acetylenicdiol and modified polymeric urea.

30. The composition of claim 25, comprising a polymeric acrylate based wetting agent.

31. The composition of claim 25, formulated as a high solids coating.

32. The composition of claim 25, wherein one coat of the composition can be applied to provide a coat at least 8 mils thick.

33. The composition of claim 25, comprising less than about 30% volatile components which evaporate within 48 hours of application.

34. The composition of claim 33, comprising less than about 10% volatile components.

35. A method of providing differently colored epoxy coating compositions, comprising:
    providing a container of base composition comprising an uncured epoxy resin and a plurality of bins of pigment that are compatible with the coating composition; and
    selectively mixing in pigments from the bins to at least three different containers of coating composition to provide at least three differently colored coating compositions.

36. The method of claim 34, wherein the at least three colors of the at least three differently colored coating compositions are based on red, yellow and blue.

37. A method of forming an epoxy coating composition, comprising mixing a wetting agent into an uncured epoxy resin and mixing light, white or neutral colored particles into the resin/wetting agent mix to provide an epoxy coating composition that is compatible with a plurality of different pigments to provide a plurality of differently colored epoxy coating compositions having substantially uniform color properties.

* * * * *